US009809963B2

(12) United States Patent
Huang

(10) Patent No.: US 9,809,963 B2
(45) Date of Patent: Nov. 7, 2017

(54) LEAK-PROOF WATER VALVE OF TOILET TANK

(71) Applicant: So-Mei Huang, Tai Ping (TW)

(72) Inventor: So-Mei Huang, Tai Ping (TW)

( * ) Notice: Subject to any disclaimer, the term of this patent is extended or adjusted under 35 U.S.C. 154(b) by 99 days.

(21) Appl. No.: 15/067,601

(22) Filed: Mar. 11, 2016

(65) Prior Publication Data

US 2017/0260727 A1    Sep. 14, 2017

(51) Int. Cl.
| F16K 21/18 | (2006.01) |
| F16K 31/20 | (2006.01) |
| F16K 31/24 | (2006.01) |
| F16K 31/26 | (2006.01) |
| F16K 31/34 | (2006.01) |
| E03D 1/00 | (2006.01) |
| E03D 1/32 | (2006.01) |
| E03D 1/33 | (2006.01) |
| E03D 1/34 | (2006.01) |
| E03D 1/36 | (2006.01) |
| G05D 9/02 | (2006.01) |

(52) U.S. Cl.
CPC ............... *E03D 1/36* (2013.01); *E03D 1/00* (2013.01); *E03D 1/32* (2013.01); *E03D 1/33* (2013.01); *E03D 1/34* (2013.01); *F16K 21/18* (2013.01); *F16K 31/20* (2013.01); *F16K 31/24* (2013.01); *F16K 31/26* (2013.01); *F16K 31/34* (2013.01); *G05D 9/02* (2013.01); *Y10T 137/7439* (2015.04); *Y10T 137/7462* (2015.04); *Y10T 137/7472* (2015.04); *Y10T 137/7494* (2015.04)

(58) Field of Classification Search
CPC .......... F16K 21/18; F16K 31/20; F16K 31/24; F16K 31/26; F16K 31/34; F16K 33/00; E03D 1/32; E03D 1/33; E03D 1/36; E03D 1/00; Y10T 137/7439; Y10T 137/7462; Y10T 137/7494; Y10T 137/7472; G05D 9/02
See application file for complete search history.

(56) References Cited

U.S. PATENT DOCUMENTS

| 3,693,649 A * | 9/1972 | Gordon | F16K 31/34 137/414 |
| 4,843,657 A * | 7/1989 | Orr | E03D 1/00 137/410 |
| 5,211,204 A * | 5/1993 | Mikol | E03D 1/144 137/410 |
| 5,287,882 A * | 2/1994 | Mikol | E03D 1/00 137/410 |
| 5,542,448 A * | 8/1996 | Campbell | E03D 1/00 137/410 |
| 8,132,273 B2 * | 3/2012 | Bouchard | E03D 1/00 137/410 |

FOREIGN PATENT DOCUMENTS

FR    WO 2010100096 A1 *  9/2010  ............... E03D 1/32

* cited by examiner

*Primary Examiner* — Mary McManmon
*Assistant Examiner* — Hailey K Do
(74) *Attorney, Agent, or Firm* — Guice Patents PLLC

(57) ABSTRACT

A leak-proof water valve includes a water inner tube, an outer tube group and a buoyant housing. When the sealing plug of the toilet tank is leaking, leak-proof structure of a buoyant housing for automatically detection is provided to stop the water inlet valve supplying water, so that a user could be aware of the leaking situation to thereby avoid the waste of water resources.

7 Claims, 16 Drawing Sheets

LEAK-PROOF WATER VALVE OF TOILET TANK

BACKGROUND OF THE INVENTION a) Field of the Invention

The invention relates to a leak-proof water valve of a toilet tank and, more particularly, to a leak-proof water valve of the toilet tank with self-sealing function, which is provided to stop water flowing into the toilet tank when a sealing plug of the toilet tank is leaking, to achieve automatic stop-leaking purpose.

b) Description of Prior Art

Water shortage problem is increasingly severe in recent years. Governments at all levels mostly charge a fine as punishment for wasting water to remind the importance of saving water. Except a washing machine, a toilet tank is the place that consumes most water in a common family. An abnormal water-consuming situation of a toilet tank is usually the most inconspicuous one, so that consumers usually find water leakage after it happens for a long period of time, there is a punitive fine and it is also unnecessary waste of water resources.

Above all, one of the main reasons of the toilet tank problem is that the sealing plug is leaking. If a large amount of water leakage is not immediately stopped, water rate may become huge water rate. Although, some solutions have been proposed for avoiding this kind of water leakage situation in industry, there is no ideal results so far.

SUMMARY OF THE INVENTION

In view of this, the object of the invention is to provide a leak-proof water valve of a toilet tank, namely, the object of the invention is to provide a leak-proof water valve of the toilet tank with self-sealing function, which is provided to stop water flowing into the toilet tank when a sealing plug of the toilet tank is leaking, to achieve automatic stop-leaking purpose.

To achieve the object, the first embodiment of the leak-proof water valve of the toilet tank of the present invention, including a water inner tube, an outer tube group and a buoyant housing, wherein:

the water inner tube, an engaging bolt and multiple outlets are set on its lower side, the engaging bolt is set on a bottom side of the toilet tank and a locking nut is used to fasten;

the outer tube group, which is consisted of an outer tube, a cover, a connecting rod, an adjustment rod, a sealing plug and an elastic element; the outer tube is set on an outer peripheral edge of the water inner tube, a water control base and an outlet pipe are set on an upper end of the outer tube, a first arm, a second arm and an outlet hole are set on the water control base, the outlet hole is communicated with an outlet through pipe set inside the outer tube, a first positioning hole and a first shaft hole are set on the first arm, a second shaft hole is set on the second arm, the first shaft hole is corresponded to the second shaft hole; the cover is covered on a top of the water control base; a second positioning hole, two corresponding supporting shafts and two hook arms are set on an inner side of the connecting rod, a notch is set between the two hook arms, the two corresponding supporting shafts are set into the first and second shaft holes respectively, a holder is set on an outer side of the connecting rod; a sleeve segment set on an upper end of the adjustment rod is provided for the holder to hold, an adjustment segment is set on a lower section of the adjustment rod; a transverse rod is set on an upper end of the sealing plug, the transverse rod is clamped by the two hook arms, an lower section of the sealing plug is a cotter, the cotter is inserted between the outlet hole and a through hole of a pad, the sealing plug is provided to move up and down to control operations of the outlet through pipe; a first pin of the elastic element is fixed to the first positioning hole, a second pin of the elastic element is fixed to the second positioning hole;

the buoyant housing, a punched hole set on it is provided for the outer tube being inserted, so that the buoyant housing could be moved up and down on the peripheral edge of the outer tube, a preloading room and a loading room are set on a top of the buoyant housing, the position of the preloading room is higher than the loading room, a water hole is set between the preloading room and the loading room, a buoyant room is set on a bottom side of the buoyant housing, two corresponding slides and two corresponding third arms are set outside of the peripheral edge of the buoyant housing corresponding to the loading room, a first drain hole is set between the two slides, the two slides are provided for a switching blade to embed into, a second drain hole is set on a lower side of the switching blade, a shaft hole is set on the third arm, the shaft hole is provided for a supporting shaft of a positioning collar to set on, a hollow hole set on the positioning collar is provided for the adjustment segment of the adjustment rod to insert.

The second embodiment of the leak-proof water valve of a toilet tank of the present invention, which includes a water inner tube, an outer tube group and a buoyant housing, wherein:

the water inner tube, an engaging bolt and multiple outlets are set on its lower side, the engaging bolt is set on a bottom side of the toilet tank and a locking nut is used to fasten;

the outer tube group, which is consisted of an outer tube, a cover, a connecting rod, an adjustment rod, a sealing plug, a cross rod and an elastic element; the outer tube is set on an outer peripheral edge of the water inner tube, a water control base and an outlet pipe are set on an upper end of the outer tube, a first arm, a second arm, a shaft tube and an outlet hole are set on the water control base, the outlet hole is communicated with an outlet through pipe set inside the outer tube, a first positioning hole and a first shaft hole are set on the first arm, a second shaft hole is set on the second arm, the first shaft hole is corresponded to the second shaft hole; the cover is covered on a top of the water control base; a second positioning hole, two corresponding supporting shafts and two hook arms are set on an inner side of the connecting rod, a notch is set between the two hook arms, the two corresponding supporting shafts are set into the first and second shaft holes respectively, a holder is set on an outer side of the connecting rod; a sleeve segment set on an upper end of the adjustment rod is provided for the holder to hold, an adjustment segment is set on a lower section of the adjustment rod; a transverse rod is set on an upper end of the sealing plug, the transverse rod is clamped by the two hook arms, an lower section of the sealing plug is a cotter, the cotter is inserted between the outlet hole and a through hole of a pad, the sealing plug is provided to move up and down to control operations of the outlet through pipe; an end of the cross rod is connected to an end of a second chain, another end of the second chain is set on a pull rod, a hinge is set on another end of the cross rod, the hinge is set on the shaft tube; a first pin of the elastic element is fixed to the first positioning hole, a second pin of the elastic element is fixed to the second positioning hole;

the buoyant housing, a punched hole set on it is provided for the outer tube being inserted, so that the buoyant housing could be moved up and down on the peripheral edge of the outer tube, a preloading room and a loading room are set on a top of the buoyant housing, the position of the preloading room is higher than the loading room, a water hole is set between the preloading room and the loading room, a buoyant room is set on a bottom side of the buoyant housing, two corresponding third arms and a first drain hole are set outside of the peripheral edge of the buoyant housing corresponding to the loading room, a shaft hole is set on the third arm, the shaft hole is provided for a supporting shaft of a positioning collar to set on, a hollow hole set on the positioning collar is provided for the adjustment segment of the adjustment rod to insert.

DETAILED DESCRIPTION OF THE INVENTION

Figure 1:
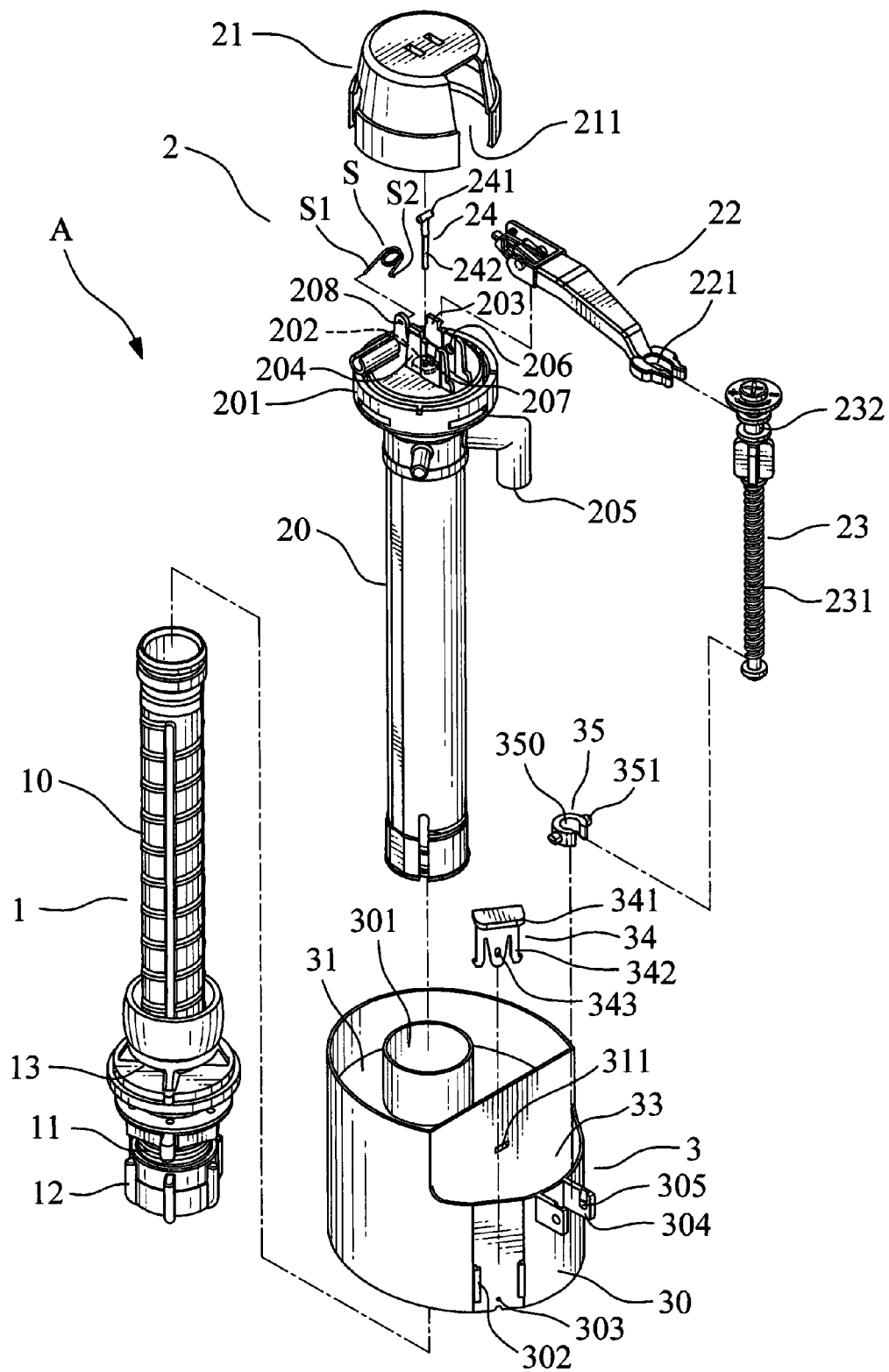
FIG. 1 is a three-dimensional exploded diagram of the first embodiment of the present invention.
Figure 2:
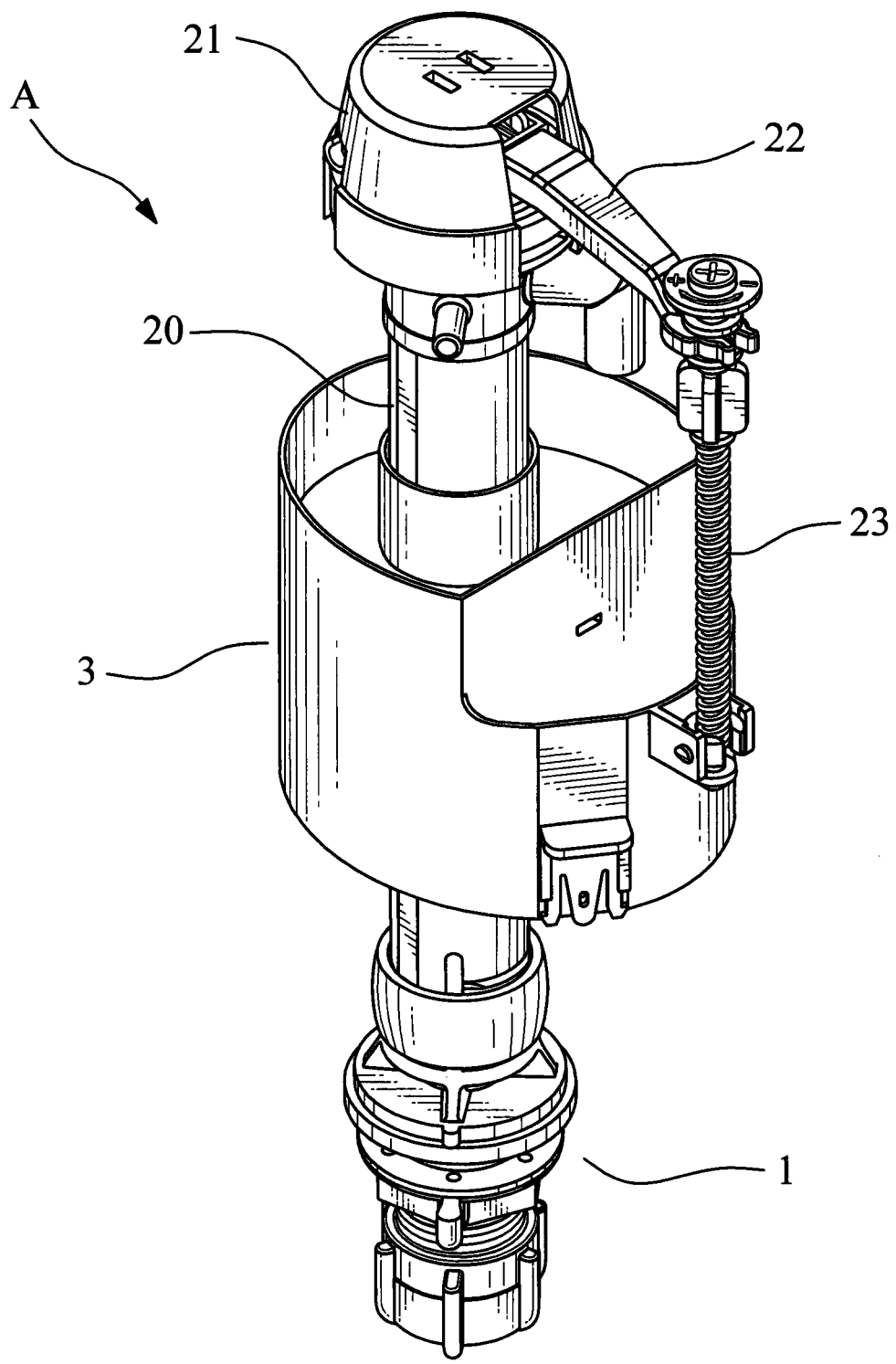
FIG. 2 is a three-dimensional diagram of the first embodiment of the present invention.

Please refer to FIG. 1 to FIG. 9, it is the first embodiment of the leak-proof water valve of the toilet tank of the present invention, the leak-proof water valve A includes a water inner tube 1, an outer tube group 2 and a buoyant housing 3, wherein:

the water inner tube 1, an engaging bolt 11 and multiple outlets 13 are set on its lower side, the engaging bolt 11 is set on a bottom side of the toilet tank 4 and a locking nut 12 is used to fasten;

the outer tube group 2, which is consisted of an outer tube 20, a cover 21, a connecting rod 22, an adjustment rod 23, a sealing plug 24 and an elastic element S; the outer tube 20 is set on an outer peripheral edge 10 of the water inner tube 1, a water control base 201 and an outlet pipe 205 are set on an upper end of the outer tube 20, a first arm 203, a second arm 204 and an outlet hole 202 are set on the water control base 201, the outlet hole 202 is communicated with an outlet through pipe 200 set inside the outer tube 20, a sealing ring C1 and a pad C2 are set between the water control base 201 and the outlet through pipe 200, a first positioning hole 208 and a first shaft hole 206 are set on the first arm 203, a second shaft hole 207 is set on the second arm 204, the first shaft hole 206 is corresponded to the second shaft hole 207; the cover 21 is covered on a top of the water control base 201; an opening 211 is set on a side of the cover 21; a second positioning hole 226, two corresponding supporting shafts 222, 223 and two hook arms 225, 227 are set on an inner side of the connecting rod 22, a notch 24 is set between the two hook arms 225, 227, the two corresponding supporting shafts 222, 223 are set into the first shaft hole 206 and second shaft hole 207 respectively, an outer end of the connecting rod 22 is extended out from the opening 211 of the cover 21, and a holder 221 is set on it; a sleeve segment 232 set on an upper end of the adjustment rod 23 is provided for the holder 221 to hold, an adjustment segment 231 is set on a lower section of the adjustment rod 23; a transverse rod 241 is set on an upper end of the sealing plug 24, the transverse rod 241 is clamped by the two hook arms 225, 227, an lower section of the sealing plug 24 is a cotter 242, multiple longitudinal grooves 243 are set on the cotter 242, the cotter 242 is inserted between the outlet hole 202 and a through hole C21 of a pad C2, the sealing plug 24 is provided to move up and down to control operations of the outlet through pipe 200; a first pin S1 of the elastic element S is fixed to the first positioning hole 208, a second pin S2 of the elastic element S is fixed to the second positioning hole 226;

the buoyant housing 3, a punched hole 301 set on it is provided for the outer tube 20 being inserted, so that the buoyant housing 3 could be moved up and down on the peripheral edge of the outer tube 20, a preloading room 31 and a loading room 33 are set on a top of the buoyant housing 3, the position of the preloading room 31 is higher than the loading room 33, a water hole 311 is set between the preloading room 31 and the loading room 33, a buoyant room 32 is set on a bottom side of the buoyant housing 3, two corresponding slides 302 and two corresponding third arms 304 are set outside of the peripheral edge 30 of the buoyant housing 3 corresponding to the loading room 33, a first drain hole 303 is set between the two slides 302, the two slides 302 are provided for a switching blade 34 to embed into, a handle 341 is set on an upper side of the switching blade 34, a second drain hole 343 is set on a lower side of the switching blade 34, two hook pieces 342 are respectively set on two sides of the switching blade 34, a shaft hole 305 is set on the third arm 304, the shaft hole 305 is provided for a supporting shaft 351 of a positioning collar 35 to set on, a hollow hole 350 set on the positioning collar 35 is provided for the adjustment segment 231 of the adjustment rod 23 to insert.

Figure 3:
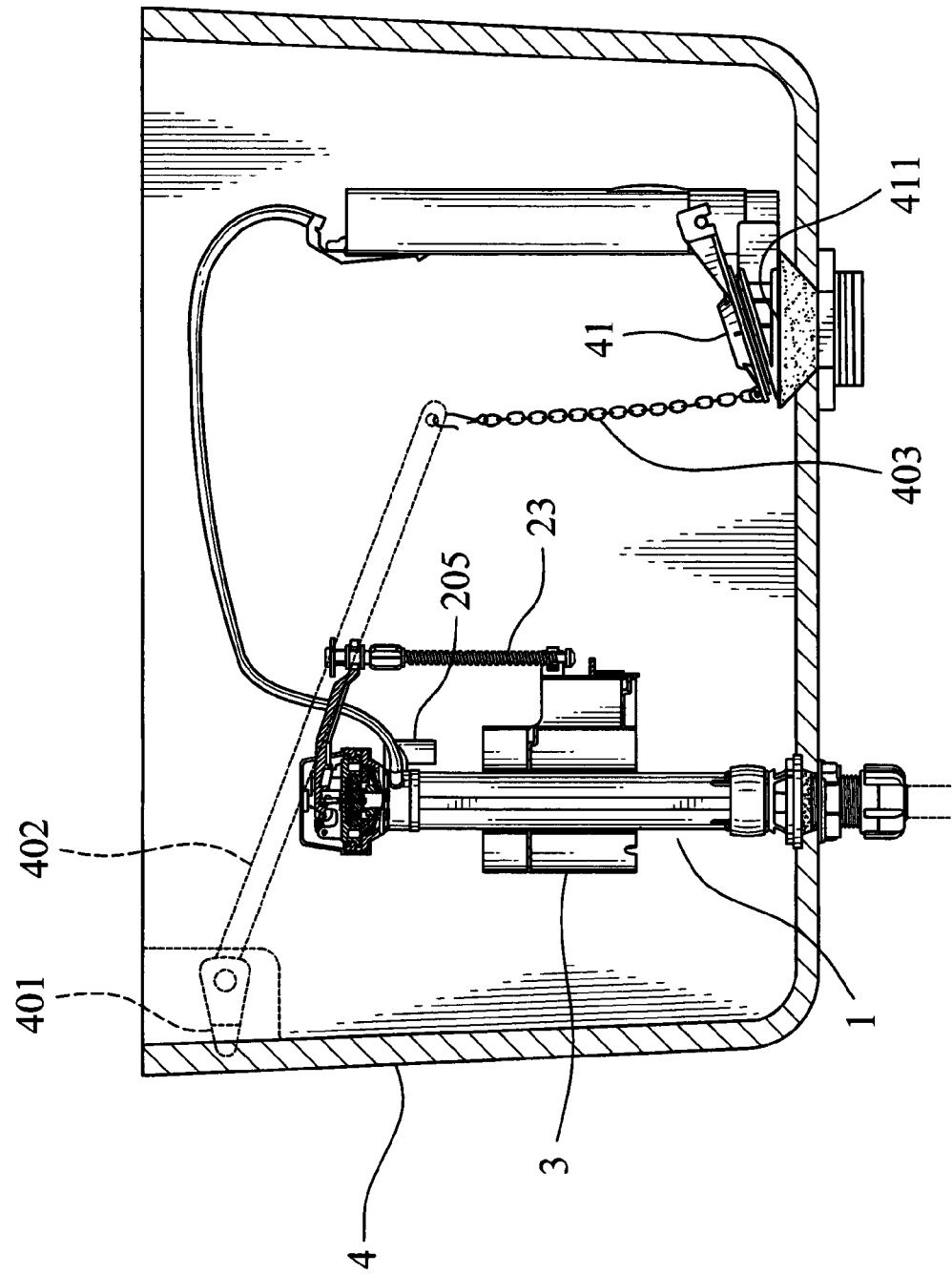
FIG. 3 is a configuration diagram of the toilet tank of the first embodiment of the present invention.
Figure 4:
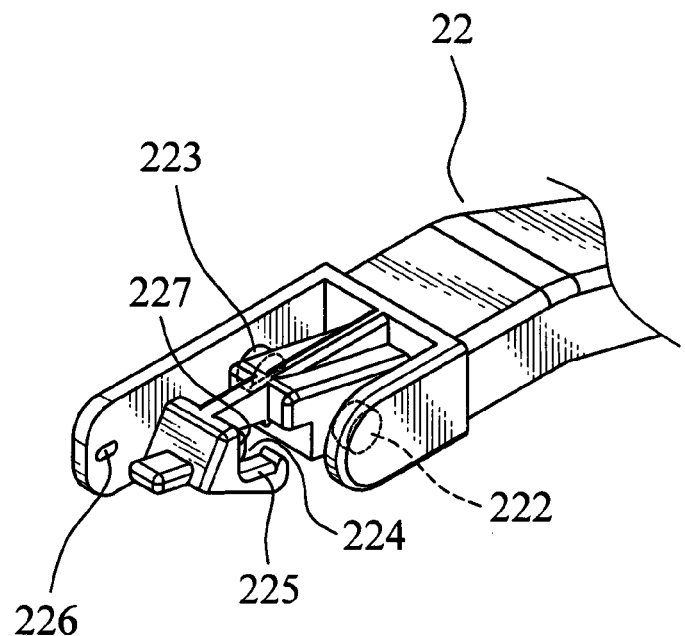
FIG. 4 is a partial three-dimensional diagram of the connecting rod of the first and second embodiments of the present invention.
Figure 5:
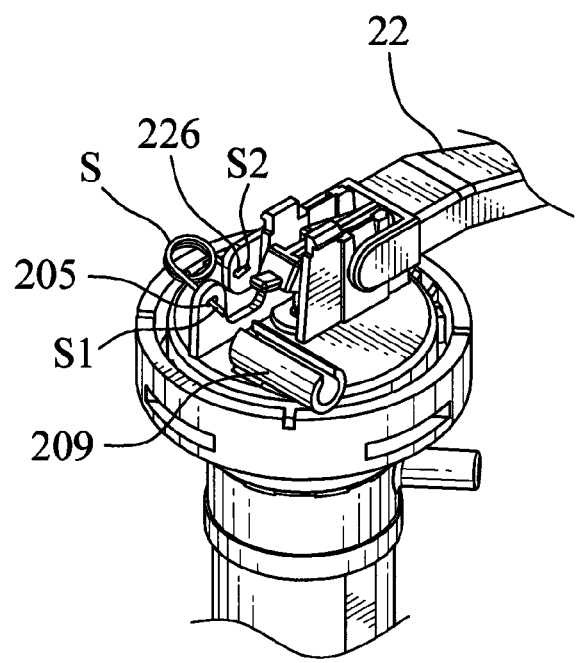
FIG. 5 is a partial three-dimensional diagram of the assembly of the connecting rod and the water control base of the first embodiments of the present invention.
Figure 6:
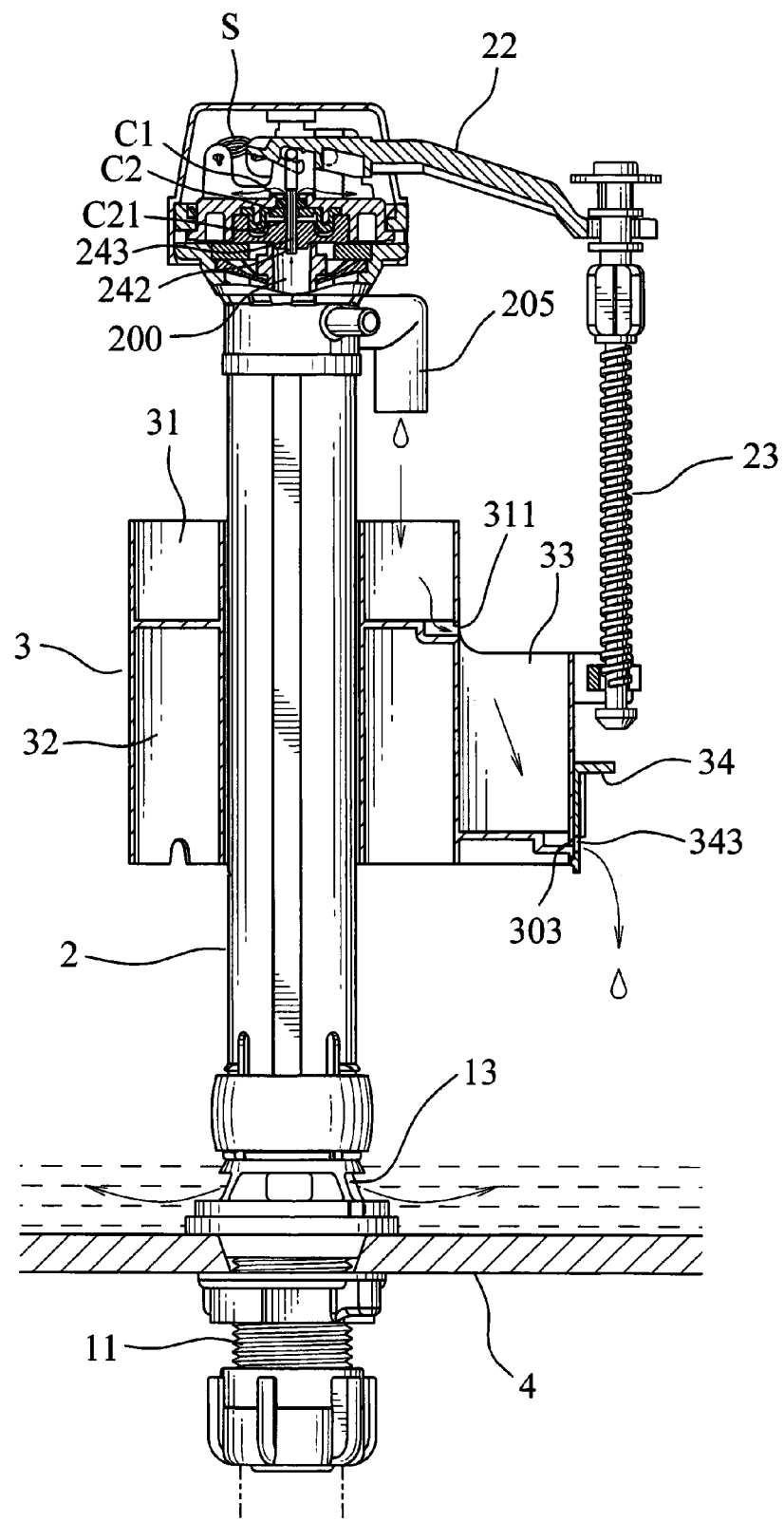
FIG. 6 is a schematic diagram (1) of operation of the first embodiment of the present invention.
Figure 7:
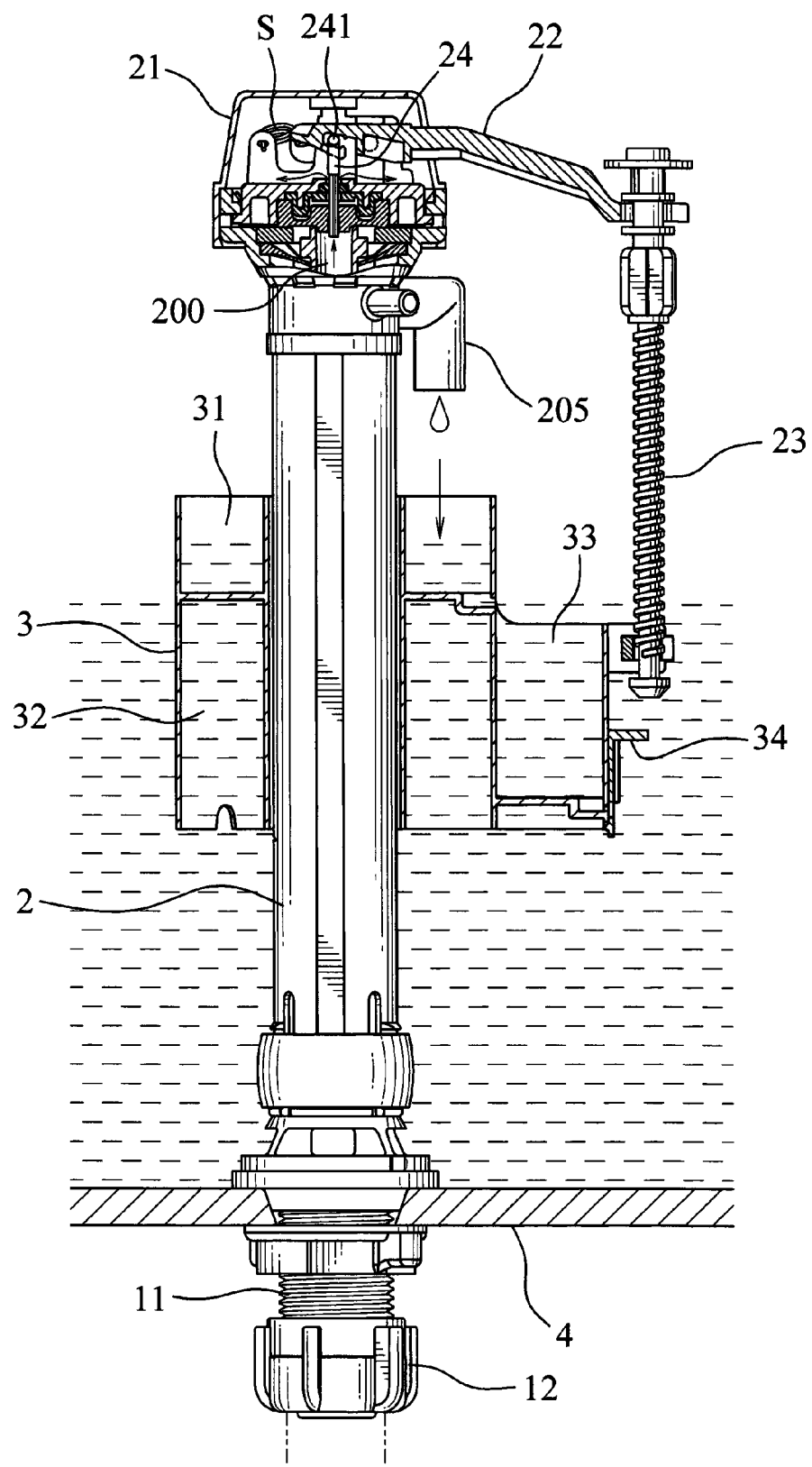
FIG. 7 is a schematic diagram (2) of operation of the first embodiment of the present invention.
Figure 8:
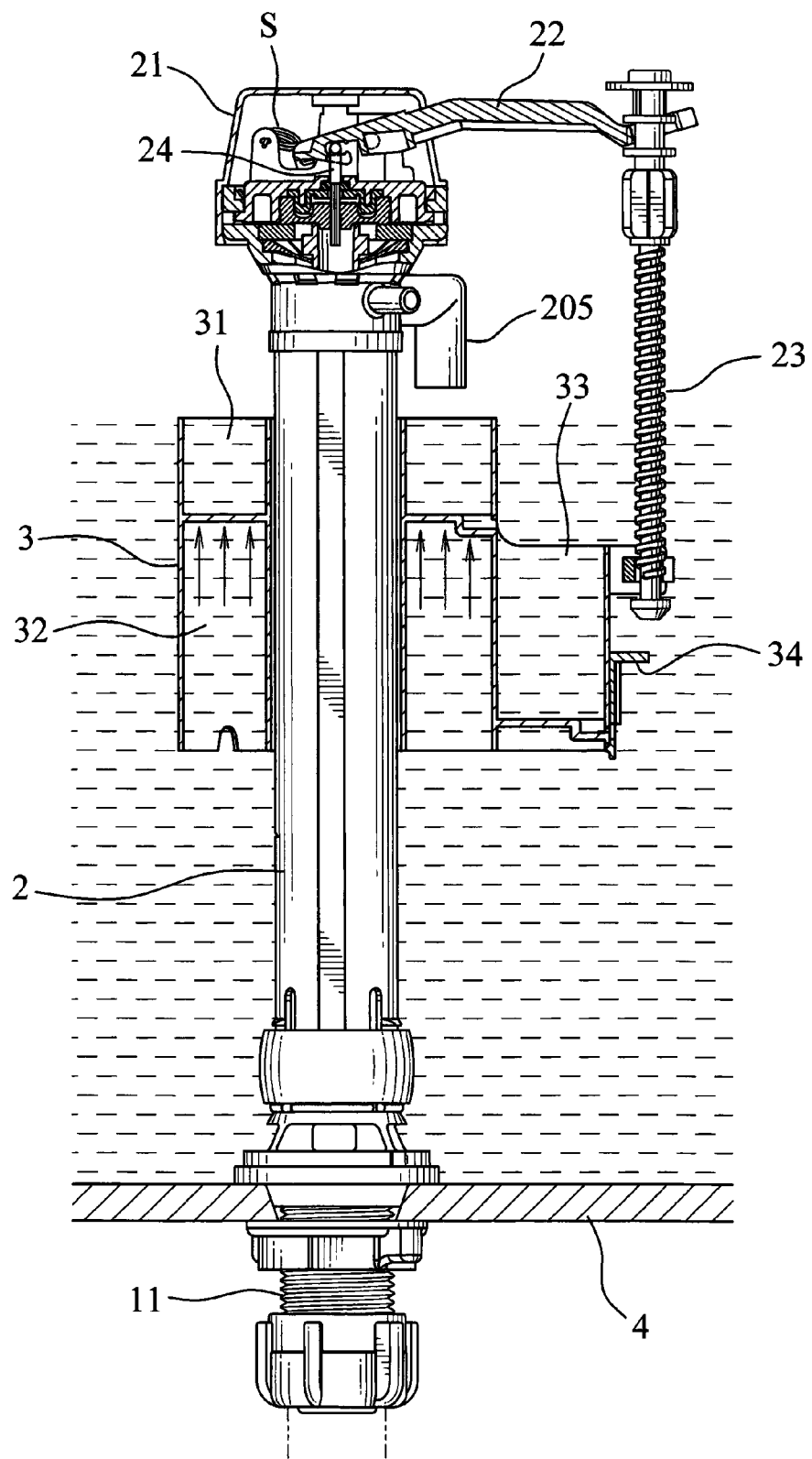
FIG. 8 is a schematic diagram (3) of operation of the first embodiment of the present invention.

Please refer to FIG. 3, FIG. 6, FIG. 7 simultaneously, in the present invention, by the composition of above elements, under a normal situation without leaking, when a flush handle 401 is pulled downwards, the pull rod 402 is driven to pull the first chain 403 and the sealing plug 41 is raised up, so that water in the toilet tank 4 flows into the flushing outlet 411, and then the sealing plug 41 moves downwards to seal the flushing outlet 411. At this time, because the weight of water carried in the preloading room 31 and the loading room 33 of the buoyant housing 3 is larger than elasticity of the elastic element S, the outer end of the connecting rod 22 is pressed due to the weight of carried water, so that the cotter 242 of the sealing plug 24 moves upwards, water flowed from the water inlet valve A flows to the outlet hole 222 from the outlet through pipe 200. A part of water flows to the outlet pipe 205 and drops into the preloading room 31 of the buoyant housing 3, flows into the loading room 33 from the water hole 311, and finally flows into the toilet tank 4 from the second drain hole 343. At this time, the switching blade 34 is located in a position for detecting leakage automatically (namely, the communicated position of the first drain hole 303 and the second drain hole 343). And then, because the buoyant room 32 of the buoyant housing 3 is forced by buoyancy, the buoyant housing 3 may continuously rise with the water level in the toilet tank 4. Once the predetermined water line is achieved (as shown in FIG. 8), the buoyant housing 3 drives the connecting rod 22 to let its external ends raise, so that the cotter 242 of the sealing plug 24 moves downwards to block the through hole C21 of the pad C2 and water stops flowing in.

Figure 9:
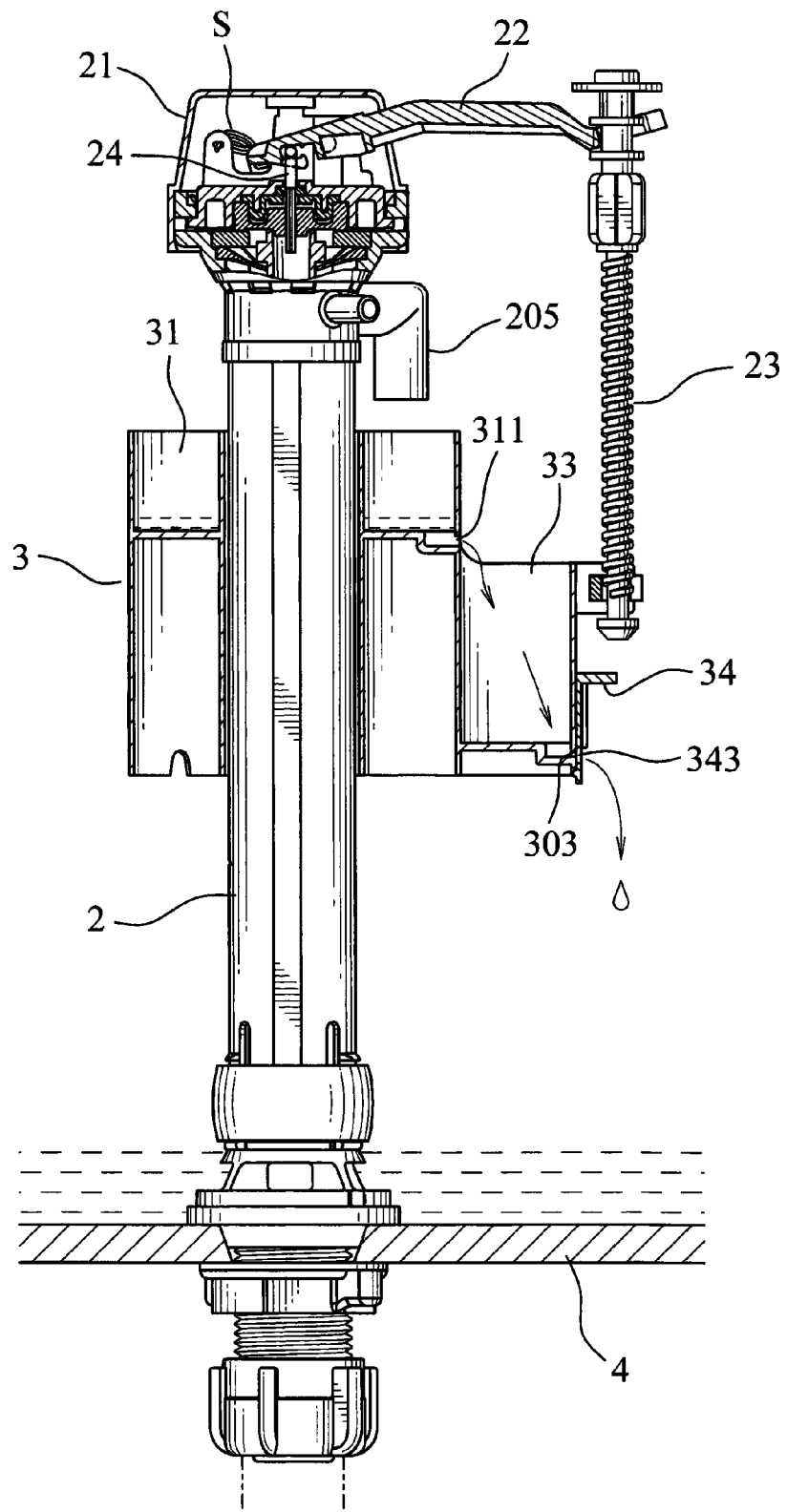
FIG. 9 is a schematic diagram (4) of operation of the first embodiment of the present invention.
Figure 10:
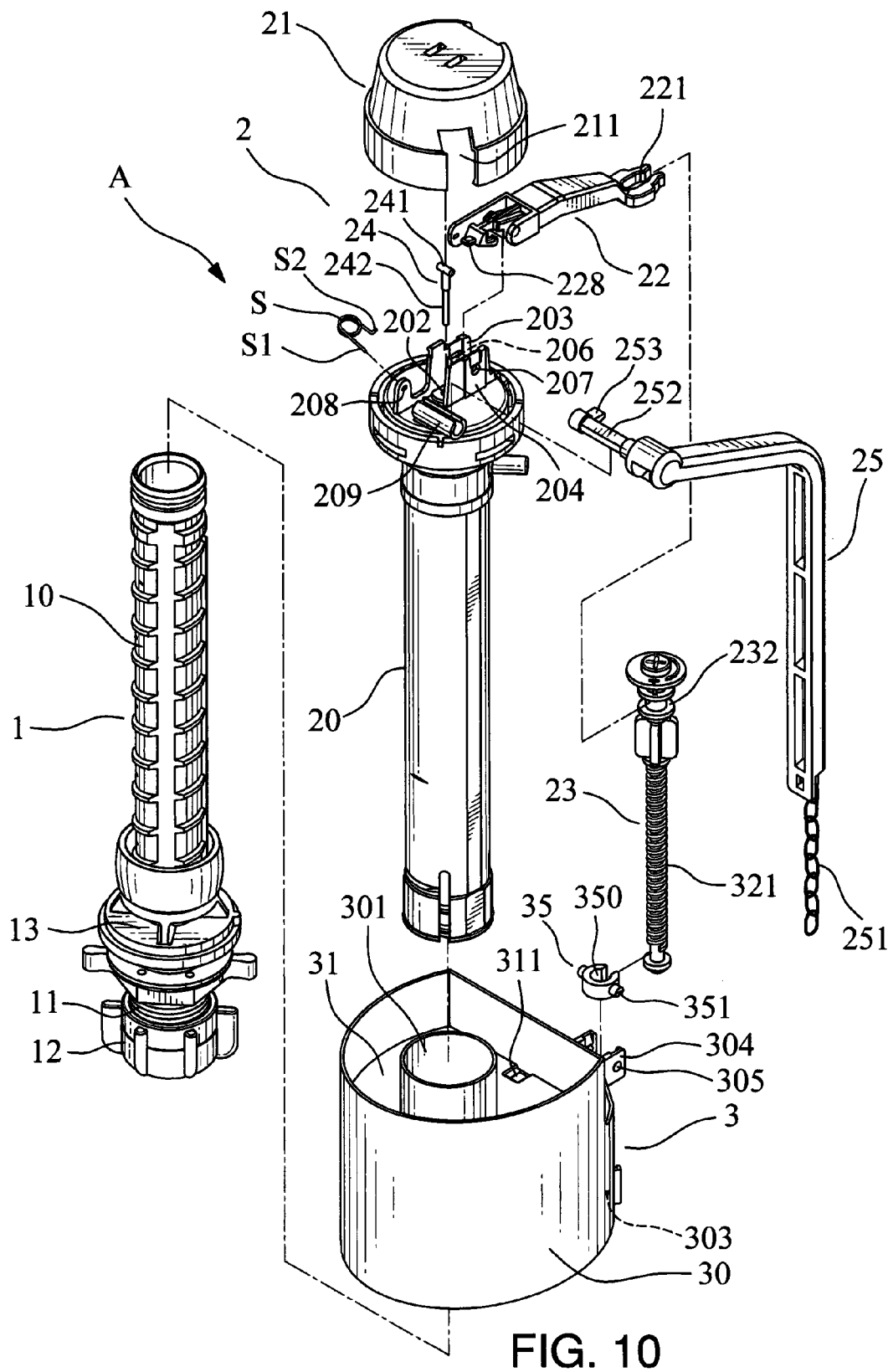
FIG. 10 is a three-dimension exploded diagram of the second embodiment of the present invention.
Figure 11:
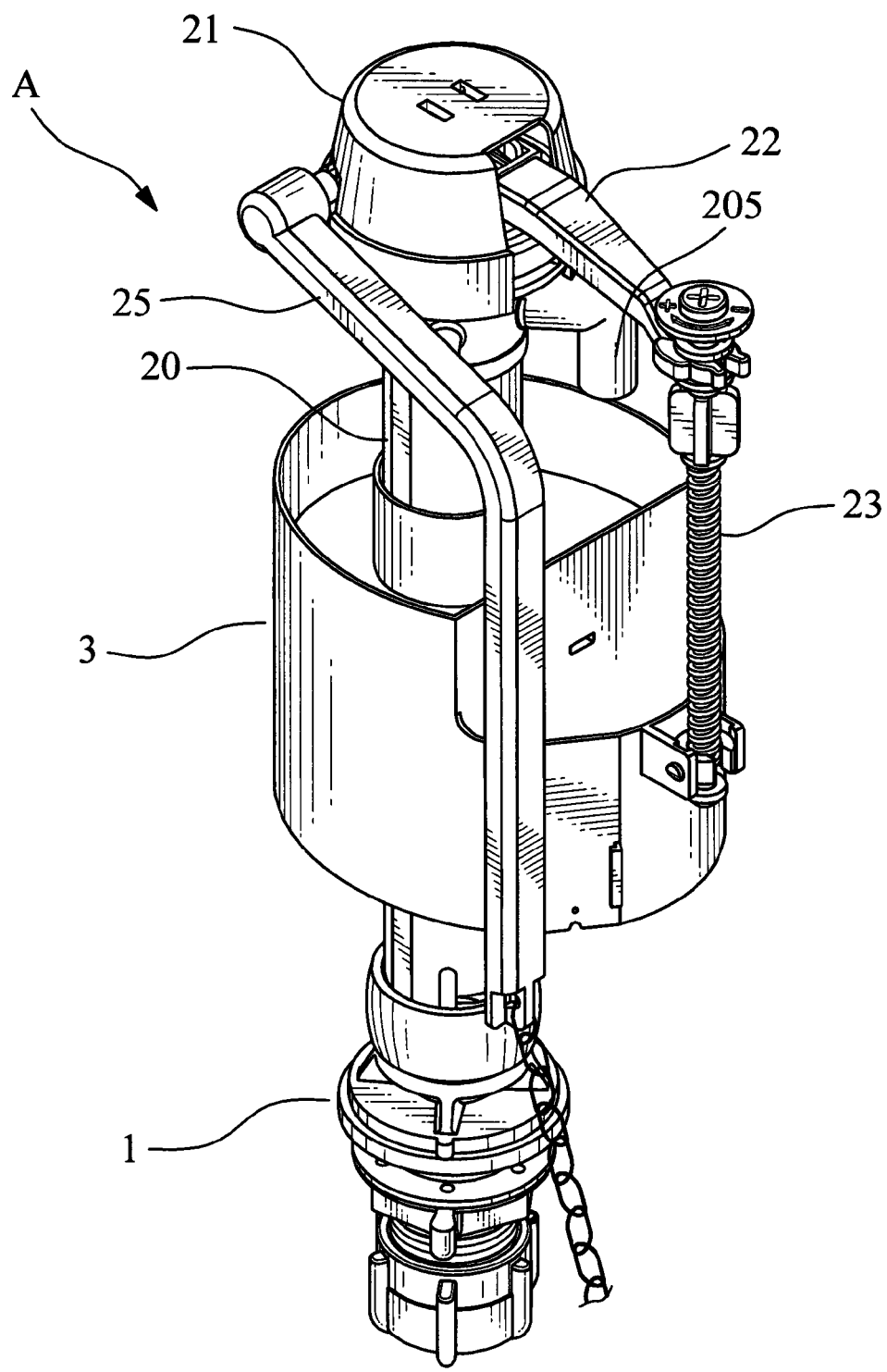
FIG. 11 is a three-dimension diagram of the second embodiment of the present invention.

Furthermore, when the sealing plug 41 is leaking (as shown in FIG. 9), water in the toilet tank 4 flows out continuously, water carried by the preloading room 31 and the loading room 33 of the buoyant housing 3 flows out from the first drain hole 303 and the second drain hole 343. Because the weight of the buoyant housing 3 is not enough to press the elasticity of the elastic element S, so that the connecting rod 22 could not drive the cotter 242 of the sealing plug 24 to move upwards for watering, to thereby achieve automatic leak-proof purpose. Thus, when a user flushes the toilet again, he will know that there is no water in the toilet tank 4 and the leakage problem is needed to be repaired. If the user wants to let water flow into the water inlet valve A again after repair, the connecting rod 22 should be pressed downwards, so that the cotter 242 of the sealing plug 24 would move upwards, water may flow into the toilet tank 4 from the water inlet valve A until the predetermined water line is achieved, and the above-mentioned automatic detection function could be applied under normal situation.

If the user doesn't want to use the automatic leakage detection function, the switching blade 34 should only be switched to let the first drain hole 303 and the second drain hole 343 not be communicated, namely, it is a general usage condition without automatic leak-proof function.

Please refer to FIG. 10 to FIG. 17, it is the second embodiment of the leak-proof water valve of the toilet tank of the present invention, the leak-proof water valve A includes a water inner tube 1, an outer tube group 2 and a buoyant housing 3, wherein:

the water inner tube 1, an engaging bolt 11 and multiple outlets 13 are set on its lower side, the engaging bolt 11 is set on a bottom side of the toilet tank 4 and a locking nut 12 is used to fasten;

the outer tube group 2, which is consisted of an outer tube 20, a cover 21, a connecting rod 22, an adjustment rod 23, a sealing plug 24, a cross rod 25 and an elastic element S; the outer tube 20 is set on an outer peripheral edge 10 of the water inner tube 1, a water control base 201 and an outlet pipe 205 are set on an upper end of the outer tube 20, a first arm 203, a second arm 204, a shaft tube 209 and an outlet hole 202 are set on the water control base 201, the outlet hole 202 is communicated with an outlet through pipe 200 set inside the outer tube 20, a sealing ring C1 and a pad C2 are set between the water control base 201 and the outlet through pipe 200, a first positioning hole 208 and a first shaft hole 206 are set on the first arm 203, a second shaft hole 207 is set on the second arm 204, the first shaft hole 206 is corresponded to the second shaft hole 207; the cover 21 is covered on a top of the water control base 201; an opening 211 is set on a side of the cover 21; a second positioning hole 226, two corresponding supporting shafts 222, 223, two hook arms 225, 227 and a first piece 228 are set on an inner side of the connecting rod 22 (please refer to FIG. 4 and FIG. 10), a notch 224 is set between the two hook arms 225, 227, the two corresponding supporting shafts 222, 223 are set into the first shaft hole 206 and the second shaft hole 207 respectively, an outer end of the connecting rod 22 is extended out of the opening 211 of the cover 2 and a holder 221 is set on it; a sleeve segment 232 set on an upper end of the adjustment rod 23 is provided for the holder 221 to hold, an adjustment segment 231 is set on a lower section of the adjustment rod 23; a transverse rod 241 is set on an upper end of the sealing plug 24, the transverse rod 241 is clamped by the two hook arms 225, 227, an lower section of the sealing plug 24 is a cotter 242, multiple longitudinal grooves 243 are set on the cotter 242, the cotter 242 is inserted between the outlet hole 202 and a through hole C21 of the pad C2, the sealing plug 24 is provided to move up and down to control operations of the outlet through pipe 200; an end of the cross rod 25 is connected to an end of a second chain 251, another end of the second chain 251 is set on a pull rod 402, a hinge 252 is set on another end of the cross rod 25, the hinge 252 is set on the shaft tube 209; a second piece 253 is set on a side of the hinge 252, the second piece 253 is provided to push the first piece 228; a first pin S1 of the elastic element S is fixed to the first positioning hole 208, a second pin S2 of the elastic element S is fixed to the second positioning hole 226;

the buoyant housing 3, a punched hole 301 set on it is provided for the outer tube 20 being inserted, so that the buoyant housing 3 could be moved up and down on the peripheral edge of the outer tube 20, a preloading room 31 and a loading room 33 are set on a top of the buoyant housing 3, the position of the preloading room 31 is higher than the loading room 33, a water hole 311 is set between the preloading room 31 and the loading room 33, a buoyant room 32 is set on a bottom side of the buoyant housing 3, two corresponding third arms 304 and a first drain hole 303 are set outside of the peripheral edge 30 of the buoyant housing 3 corresponding to the loading room 33, a shaft hole 305 is set on the third arm 304, the shaft hole 305 is provided for a supporting shaft 351 of a positioning collar 35 to set on, a hollow hole 350 set on the positioning collar 35 is provided for the adjustment segment 231 of the adjustment rod 23 to insert.

Figure 12:
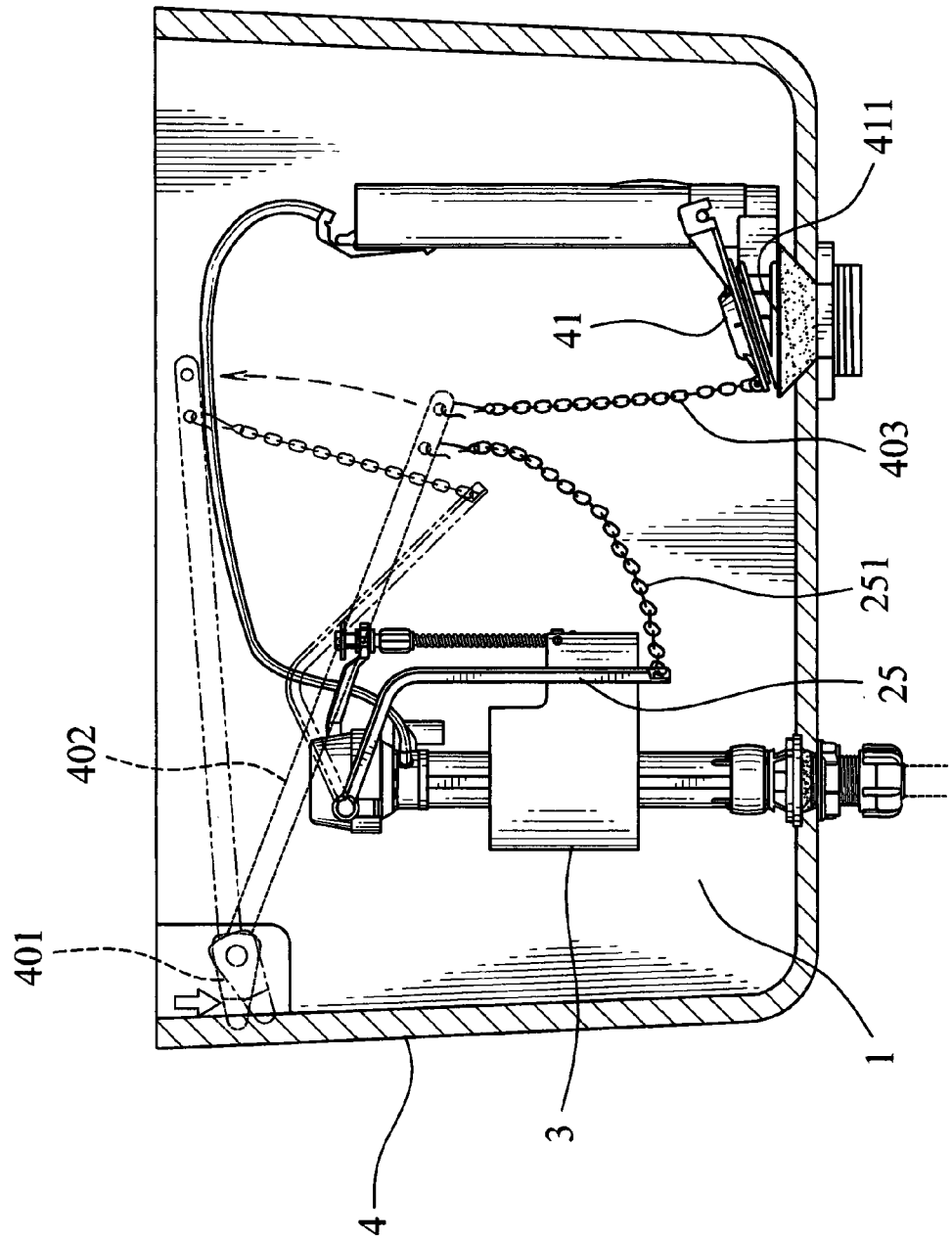
FIG. 12 is a configuration diagram of the toilet tank of the second embodiment of the present invention.
Figure 13:
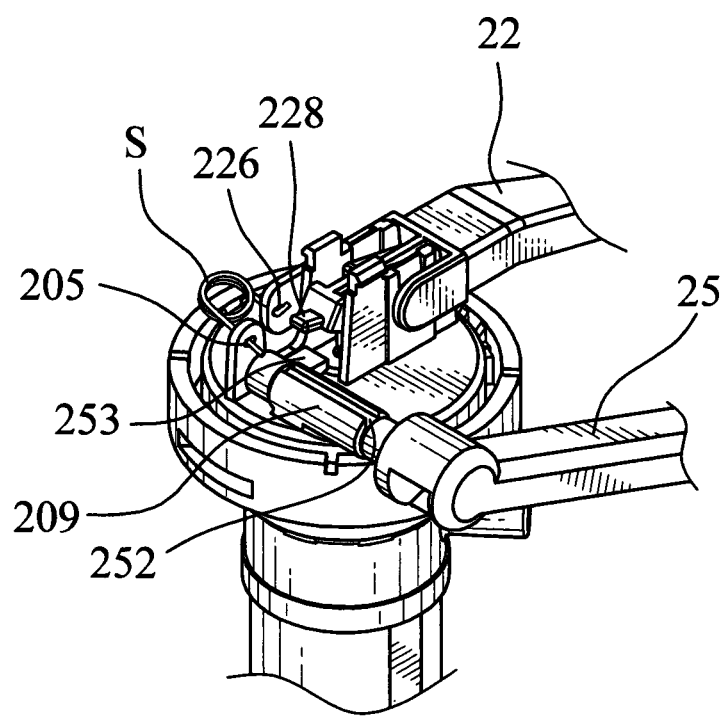
FIG. 13 is a partial three-dimensional diagram of the assembly of the connecting rod and the water control base of the second embodiments of the present invention.
Figure 14:
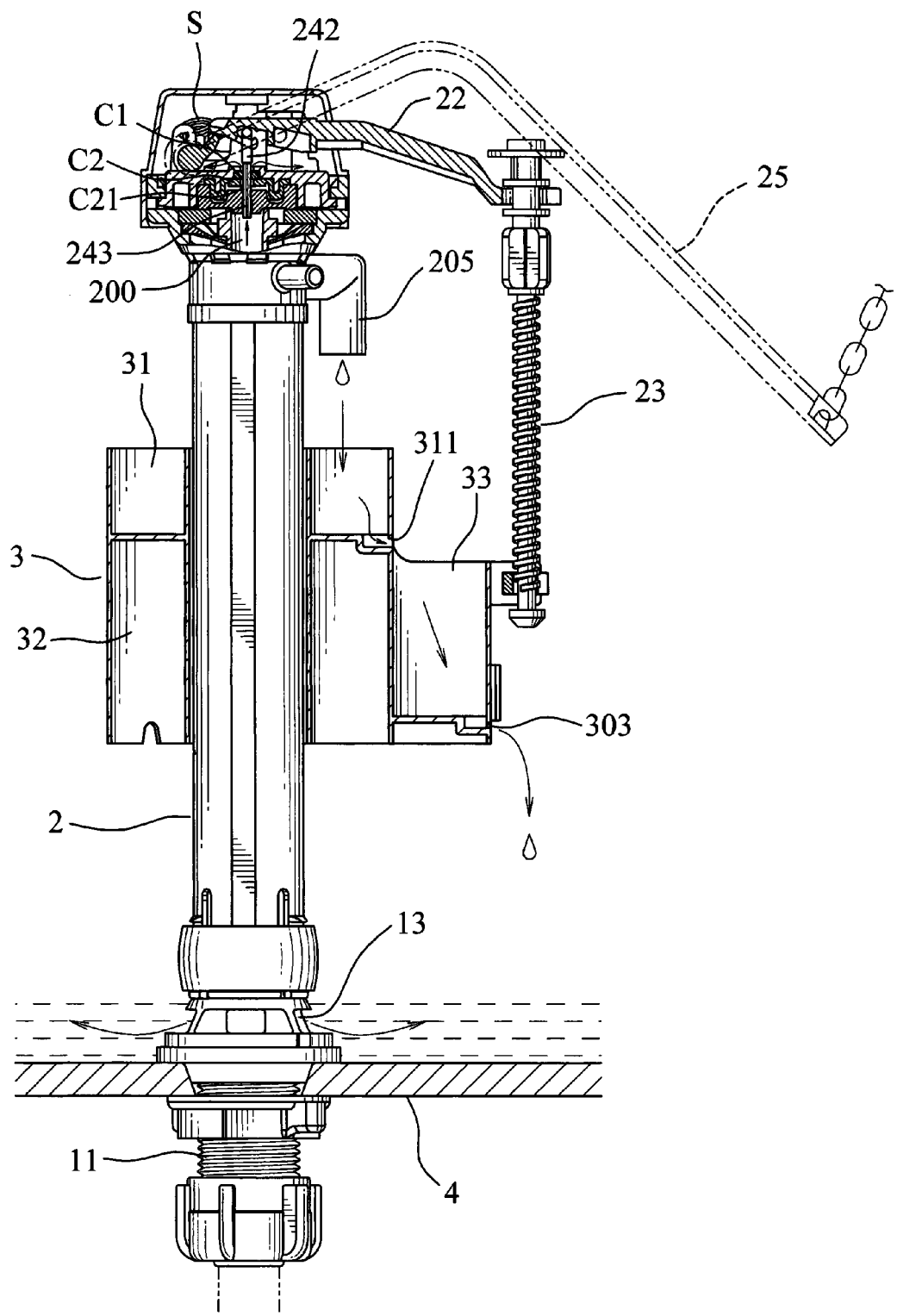
FIG. 14 is a schematic diagram (1) of operation of the second embodiment of the present invention.
Figure 15:
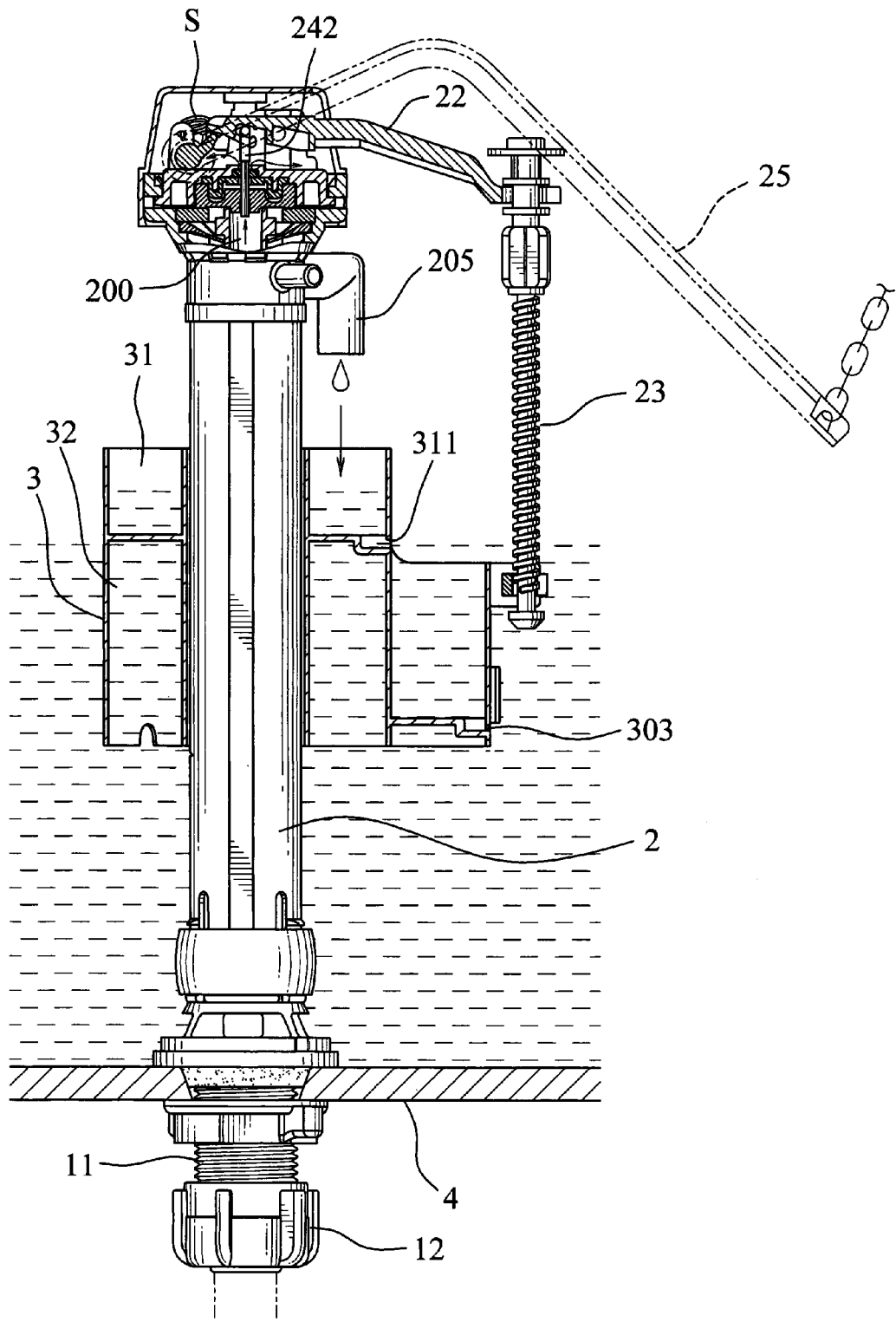
FIG. 15 is a schematic diagram (2) of operation of the second embodiment of the present invention.
Figure 16:
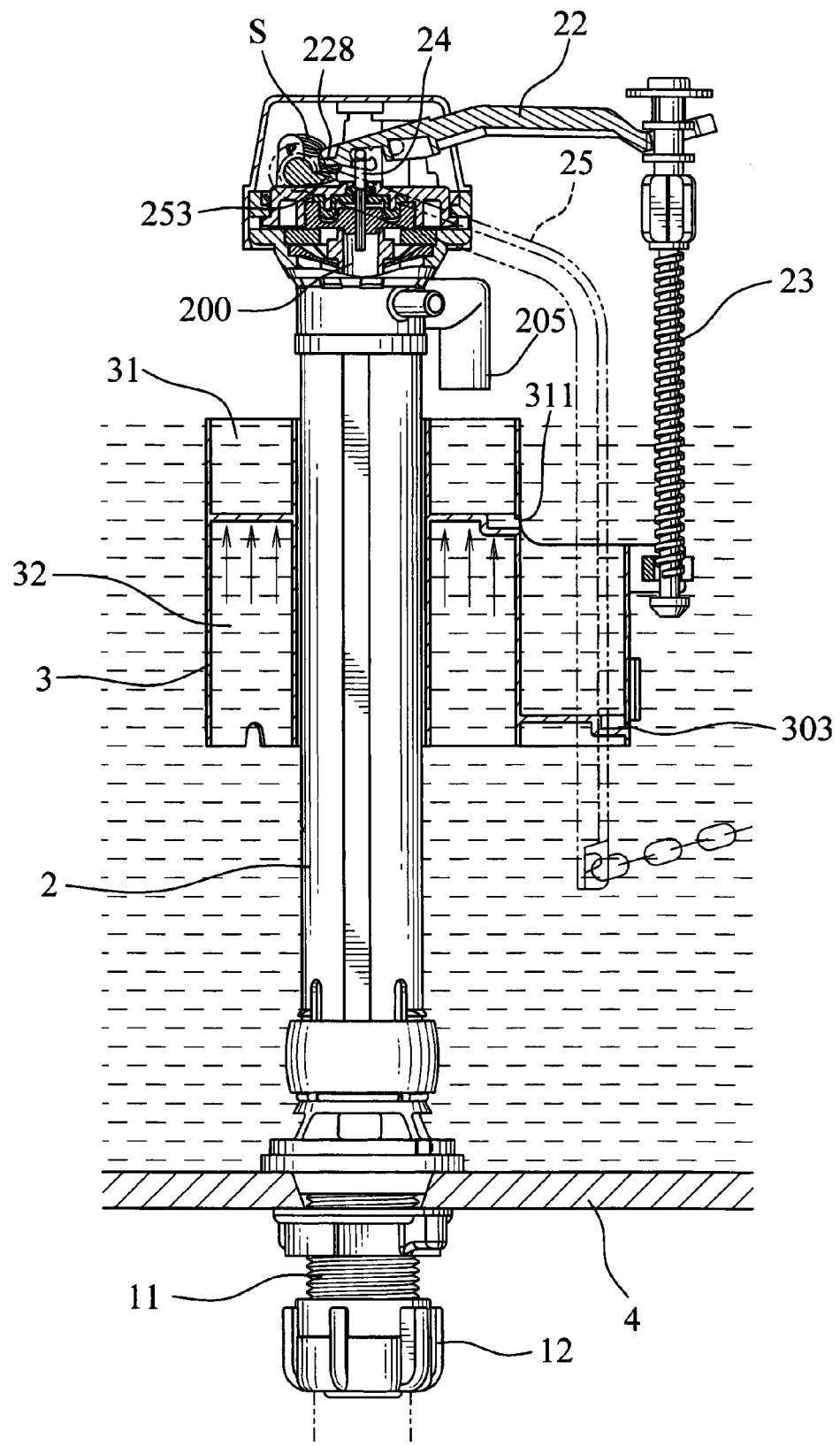
FIG. 16 is a schematic diagram (3) of operation of the second embodiment of the present invention.

Please refer to FIG. 12, FIG. 14, FIG. 15 simultaneously, in the present invention, by the composition of above elements, under a normal situation without leaking, when a flush handle 401 is pulled downwards, the pull rod 402 is driven to pull the first chain 403 and the sealing plug 41 is raised up, so that water in the toilet tank 4 flows into the flushing outlet 411, and then the sealing plug 41 moves downwards to seal the flushing outlet 411. When the flush handle 401 is pulled downwards, the pull rod 402 drives the second chain 251 simultaneously and the second piece 253 of the cross rod 25 is driven to push the first piece 228 of the connecting rod 22, so that the connecting rod 22 is pressed downwards without limiting by the elasticity of the elastic element S, and the weight of water carried in the preloading room 31 and the loading room 33 of the buoyant housing 3 is larger than elasticity of the elastic element S, the outer end of the connecting rod 22 is pressed due to the weight of carried water, so that the cotter 242 of the sealing plug 24 moves upwards, water flowed from the water inlet valve A flows to the outlet hole 202 from the outlet through pipe 200. A part of water flows to the outlet pipe 205 and drops into the preloading room 31 of the buoyant housing 3, flows into the loading room 33 from the water hole 311, and finally flows into the toilet tank 4 from the first drain hole 303. And then, because the buoyant room 32 of the buoyant housing 3 is forced by buoyancy, the buoyant housing 3 may continuously rise with the water level in the toilet tank 4. Once the predetermined water line is achieved (as shown in FIG. 16), the buoyant housing 3 drives the connecting rod 22 to let its external ends raise, so that the cotter 242 of the sealing plug 24 moves downwards to block the through hole C21 of the pad C2 and water stops flowing in.

Figure 17:
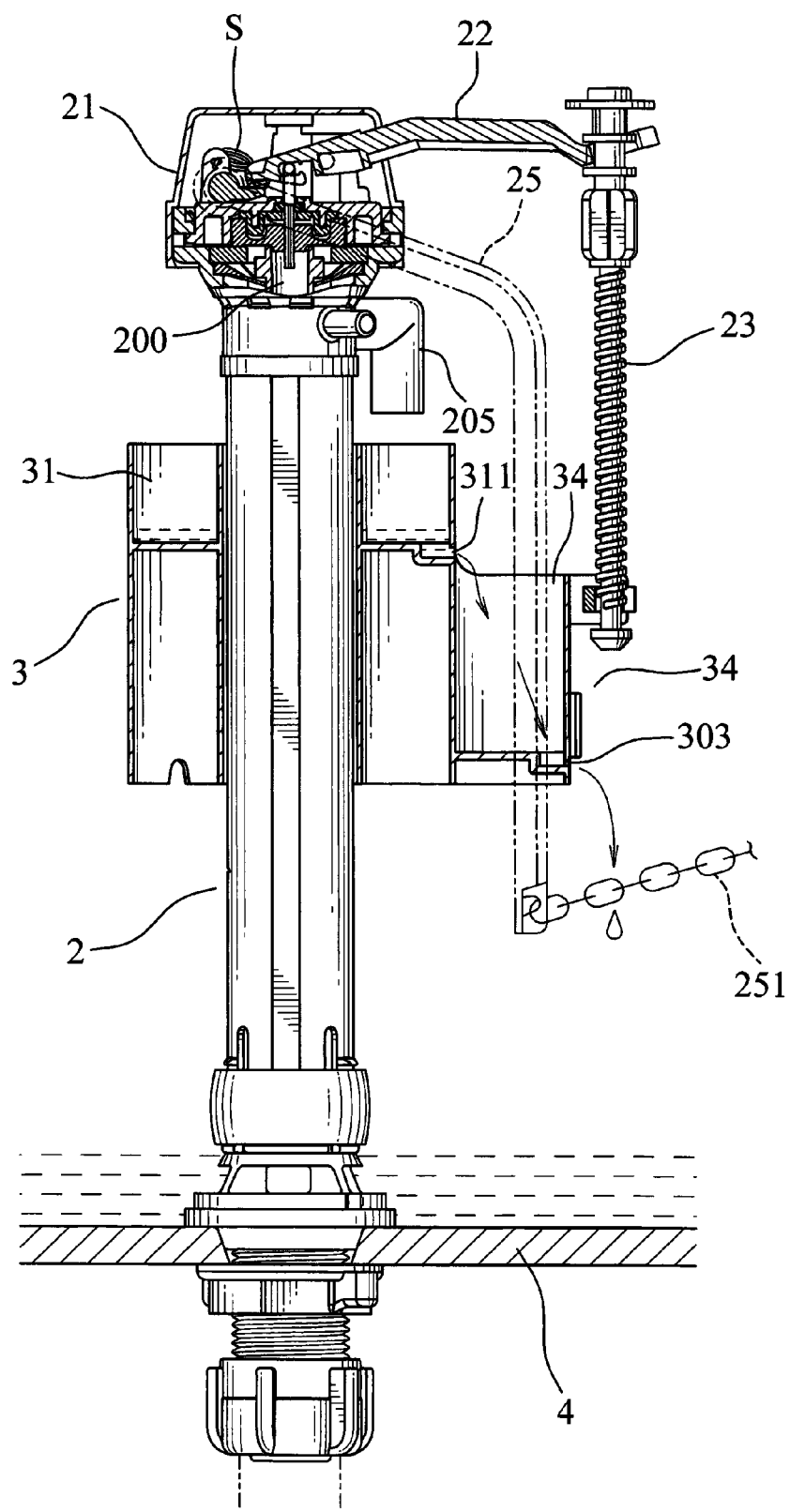
FIG. 17 is a schematic diagram (4) of operation of the second embodiment of the present invention.

Furthermore, when the sealing plug 41 is leaking (as shown in FIG. 17), water in the toilet tank 4 flows out continuously, water carried by the preloading room 31 and the loading room 33 of the buoyant housing 3 flows out from the first drain hole 303. Because the weight of the buoyant housing 3 is not enough to press the elasticity of the elastic element S, so that the connecting rod 22 could not drive the cotter 241 of the sealing plug 24 to move upwards for watering, to thereby achieve automatic leak-proof purpose. Thus, when a user flushes the toilet again, he will know that there is no water in the toilet tank 4 and the leakage problem is needed to be repaired. If the user wants to let water flow into the water inlet valve A again after repair, the flush handle 401 should be pressed downwards, the second chain 251 driven by the pull rod 402 may drive the second piece 253 of the cross rod 25 to push the first piece 228 of the connecting rod 22, so that pressing the connecting rod 22 downwards is not limited by elasticity of the elastic element S, and the cotter 241 of the sealing plug 24 would move upwards, water may flow into the toilet tank 4 from the water inlet valve A without pressing the connecting rod 22 by hands.

What is claimed is:

1. A leak-proof water valve of a toilet tank, the leak-proof water valve including: a water inner tube, an outer tube group and a buoyant housing, wherein:
    the water inner tube comprises an engaging bolt and multiple outlets are set on its lower side, the engaging bolt is set on a bottom side of the toilet tank and a locking nut is used to fasten;
    the outer tube group consists of an outer tube, a cover, a connecting rod, an adjustment rod, a sealing plug and an elastic element; the outer tube is set on an outer peripheral edge of the water inner tube; a water control base and an outlet pipe are set on an upper end of the outer tube; a first arm, a second arm and an outlet hole are set on the water control base; the outlet hole is communicated with an outlet through pipe set inside the outer tube; a first positioning hole and a first shaft hole are set on the first arm; a second shaft hole is set on the second arm; the first shaft hole is corresponded to the second shaft hole; the cover covers a top of the water control base; a second positioning hole, two corresponding supporting shafts and two hook arms are set on an inner side of the connecting rod; a notch is set between the two hook arms; the two corresponding supporting shafts are set into the first and second shaft holes respectively; a holder is set on an outer side of the connecting rod; a sleeve segment set on an upper end of the adjustment rod is provided for the holder to hold; an adjustment segment is set on a lower section of the adjustment rod; a transverse rod is set on an upper end of the sealing plug; the transverse rod is clamped by the two hook arms; at a lower section of the sealing plug is a cotter; the cotter is inserted between the outlet hole and a through hole of a pad; the sealing plug is provided to move up and down to control operations of the outlet through pipe; a first pin of the elastic element is fixed to the first positioning hole; a second pin of the elastic element is fixed to the second positioning hole;
    the buoyant housing comprises a punched hole set thereon for insertion of the outer tube, so that the buoyant housing could be moved up and down on a peripheral edge of the outer tube, a preloading room and a loading room are set on a top of the buoyant housing; a position of the preloading room is higher than the loading room; a water hole is set between the preloading room and the loading room; a buoyant room is set on a bottom side of the buoyant housing; two corresponding third arms and a first drain hole are set outside of a peripheral edge of the buoyant housing corresponding to the loading room; a shaft hole is set on at least one of the two corresponding third arms; the shaft hole is provided for setting a supporting shaft of a positioning collar, the positioning collar is provided for insertion of the adjustment segment of the adjustment rod.

2. The leak-proof water valve of the toilet tank as claimed in claim 1, wherein an opening is set on a side of the cover.

3. The leak-proof water valve of the toilet tank as claimed in claim 1, wherein multiple longitudinal grooves are set on the cotter.

4. The leak-proof water valve of the toilet tank as claimed in claim 1, wherein two corresponding slides are set outside of the peripheral edge of the buoyant housing corresponding to the loading room, the two corresponding slides are provided for a switching blade to embed into, a second drain hole is set on the switching blade.

5. A leak-proof water valve of a toilet tank, the leak-proof water valve including: a water inner tube, an outer tube group and a buoyant housing, wherein:
    the water inner tube has an engaging bolt and multiple outlets set on a lower side of the water inner tube; the engaging bolt is set on a bottom side of the toilet tank; and a locking nut is used to fasten the engaging bolt;
    the outer tube group consists of an outer tube, a cover, a connecting rod, an adjustment rod, a sealing plug, a cross rod and an elastic element; the outer tube is set on an outer peripheral edge of the water inner tube; a water control base and an outlet pipe are set on an upper end of the outer tube; a first arm, a second arm, a shaft tube and an outlet hole are set on the water control base; the outlet hole is communicated with an outlet through pipe set inside the outer tube; a first positioning hole and a first shaft hole are set on the first arm; a second shaft hole is set on the second arm; the first shaft hole is corresponded to the second shaft hole; a sealing ring and a pad are set between the water control base and the outlet through pipe; the cover covers a top of the water control base; a second positioning hole, two corresponding supporting shafts, two hook arms and a first piece are set on an inner side of the connecting rod; a notch is set between the two hook arms; the two corresponding supporting shafts are set into the first and second shaft holes respectively; a holder is set on an outer side of the connecting rod; a sleeve segment set on an upper end of the adjustment rod is provided for the holder to hold; an adjustment segment is set on a lower section of the adjustment rod; a transverse rod is set on an upper end of the sealing plug; the transverse rod is clamped by the two hook arms; at a lower section of the sealing plug is a cotter; the cotter is inserted between the outlet hole and a through hole of the pad; the sealing plug is provided to move up and down to control operations of the outlet through pipe; an end of the cross rod is connected to an end of a second chain; another end of the second chain is set on a pull rod; a hinge is set on another end of the cross rod; a second piece is set on a side of the hinge; the second piece is provided to push the first piece; the hinge is set on the shaft tube; a first pin of the elastic element is fixed to the first positioning hole; a second pin of the elastic element is fixed to the second positioning hole; and the buoyant housing; has a punched hole is set thereon for insertion of the outer tube, so that the buoyant housing could be moved up and down on the peripheral edge of the outer tube; a preloading room and a loading room are set on a top of the buoyant housing; the position of the preloading room is higher than the loading room; a water hole is set between the preloading room and the loading room; a buoyant room is set on a bottom side of the buoyant housing; two corresponding third arms and a first drain hole are set outside of a peripheral edge of the buoyant housing corresponding to the loading room; a shaft hole is set on the third arm; the shaft hole is provided for a supporting shaft of a positioning collar to set thereon; the positioning collar is provided for the adjustment segment of the adjustment rod to be set therein.

6. The leak-proof water valve of the toilet tank as claimed in claim 5, wherein an opening is set on a side of the cover.

7. The leak-proof water valve of the toilet tank as claimed in claim 5, wherein multiple longitudinal grooves are set on the cotter.

\* \* \* \* \*